(12) United States Patent
Choi et al.

(10) Patent No.: US 12,396,406 B2
(45) Date of Patent: Aug. 26, 2025

(54) PLANT CONTAINER WITH INSERTION COVER AND GUIDE COVER

(71) Applicant: LG ELECTRONICS INC., Seoul (KR)

(72) Inventors: Kyukwan Choi, Seoul (KR); Minsub Kim, Seoul (KR); Yong Kim, Seoul (KR); Joosang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 17/607,485

(22) PCT Filed: Apr. 22, 2020

(86) PCT No.: PCT/KR2020/005315
§ 371 (c)(1),
(2) Date: Oct. 29, 2021

(87) PCT Pub. No.: WO2020/222457
PCT Pub. Date: Nov. 5, 2020

(65) Prior Publication Data
US 2022/0217916 A1 Jul. 14, 2022

(30) Foreign Application Priority Data

Apr. 30, 2019 (KR) .................. 10-2019-0050826

(51) Int. Cl.
*A01G 9/02* (2018.01)
*A01G 9/029* (2018.01)

(52) U.S. Cl.
CPC ........... *A01G 9/028* (2013.01); *A01G 9/0297* (2018.02)

(58) Field of Classification Search
CPC ...... A01G 9/028; A01G 9/0297; A01G 9/027; A01G 9/029; A01G 9/0295
See application file for complete search history.

(56) References Cited

U.S. PATENT DOCUMENTS 2,893,168 A * 7/1959 Kobs ................... A01G 9/0295
47/73
4,369,598 A * 1/1983 Beckwith ............... A01G 31/06
47/84
(Continued)

FOREIGN PATENT DOCUMENTS

EP 0138611 A2 * 10/1984
JP 2013-544096 12/2013
(Continued)

OTHER PUBLICATIONS

European Search Report dated Dec. 21, 2022 issued in Application No. 20798274.5.
(Continued)

*Primary Examiner* — Joshua D Huson
*Assistant Examiner* — Alanna K Peterson
(74) *Attorney, Agent, or Firm* — KED & ASSOCIATES (57) ABSTRACT

A plant container according to the present invention comprises: a container having a cultivation space therein and having an open upper surface; a guide cover covering the open upper surface of the container and having a plurality of guide openings spaced apart from each other; a medium arranged inside the container and having a plurality of seating openings provided in a number corresponding to the plurality of guide openings; and an input cover covering the upper side of the guide cover and having at least one input opening corresponding to at least one of the plurality of guide openings, wherein the at least one input opening, the one of the plurality of guide openings, and one of the plurality of seating openings are arranged in the vertical direction with respect to one center line.

16 Claims, 9 Drawing Sheets

(56) References Cited

U.S. PATENT DOCUMENTS

| | | | | |
|---|---|---|---|---|
| 4,586,288 | A | * | 5/1986 | Walton ................ A01G 9/0295 47/87 |
| 4,878,313 | A | * | 11/1989 | Polesel ............... A01G 9/0295 47/87 |
| 5,507,116 | A | * | 4/1996 | Gao .................... A01G 9/0295 47/87 |
| 2013/0118068 | A1 | | 5/2013 | Ogilvie |
| 2015/0181812 | A1 | * | 7/2015 | Vezina .................... A01G 9/02 47/65.5 |
| 2018/0338440 | A1 | * | 11/2018 | Dearinger ............ A01G 9/0297 |

FOREIGN PATENT DOCUMENTS

| | | | |
|---|---|---|---|
| JP | 5382586 | | 1/2014 |
| JP | 2017-086034 | | 5/2017 |
| KR | 20-0344752 | | 3/2004 |
| KR | 20-0421450 | | 7/2006 |
| KR | 10-2010-0005664 | | 1/2010 |
| KR | 10-1163063 | | 7/2012 |
| KR | 10-1423992 | | 8/2014 |
| KR | 20-2017-0000745 | | 3/2017 |
| KR | 20-0483158 | | 4/2017 |
| KR | 200483158 Y1 | * | 4/2017 |
| SE | 421983 B | * | 1/1978 |
| WO | WO-03015496 A2 | * | 2/2003 ................ A01C 1/00 |
| WO | WO-2017193210 A1 | * | 11/2017 ........... A01G 9/0291 |

OTHER PUBLICATIONS

International Search Report dated Jul. 23, 2020 issued in Application No. PCT/KR2020/005315.

* cited by examiner

PLANT CONTAINER WITH INSERTION COVER AND GUIDE COVER

CROSS-REFERENCE TO RELATED PATENT APPLICATIONS

This application is a U.S. National Stage Application under 35 U.S.C. § 371 of PCT Application No. PCT/KR2020/005315, filed Apr. 22, 2020, which claims priority to Korean Patent Application No. 10-2019-0050826, filed Apr. 30, 2019, whose entire disclosures are hereby incorporated by reference.

TECHNICAL FIELD

The present disclosure relates to a plant container.

BACKGROUND ART

A plant or a seed are sown in a typical plant container, and the sown plant or seed absorb nutrients and water, which are supplied to the plant container, to be grown.

For example, Korean registration utility model No. 20-0421450 entitled "Plant cultivating container" discloses a body, which includes a plurality of partitions to form a plurality of cultivation spaces, and a cover to cover one surface, which is open, of the body.

According to the related art, although a plurality of plants are sown in the plurality of cultivation spaces, it is difficult to adjust an amount of plants, which are able to be sown in one cultivation space, by considering the growth of the plants. In addition, when the plants are sown in an amount exceeding the limit of the one cultivation space, the sown plants may not be correctly grown.

In addition, although the plurality of plants are able to be sown in the plurality of cultivation spaces, the cover has to be separated from the body to sow the plant, and be re-assembled after the plants are sown. In addition, a tool to saw seeds has to be additionally used in a process of sawing seeds of a plant in soil provided in the plurality of cultivation spaces, and, when the seeds are placed in soil, which is not desired by a user, the position of the seeds has to be moved, which bothers the user.

DISCLOSURE

Technical Problem

The present disclosure is to provide a plant container capable of adjusting arrangement spacing between seeds by considering the growth of a plant.

The present disclosure is to provide a plant container capable of easily adjusting the arrangement spacing between seeds to correspond to various plants.

Technical Solution

According to the present disclosure, a plant container may include a medium disposed inside a container, a guide cover to cover the container, and an insertion cover seated on the guide cover. Openings may be formed in the medium, the guide cover, and the insertion cover to communicate with each other in a vertical direction, such that a seed is easily inserted into the container.

According to the present disclosure, in the plant container, an opening may be formed, in equal number, in a medium and a guide cover, and the number of an opening provided in the insertion cover may be adjusted, such that the arrangement spacing between mutually different seeds, which are able to be inserted into the container, may be adjusted.

According to the present disclosure, in the plant container, a first opening and a second opening provided in the guide cover are formed to have mutually different diameters to guide the movement of a seed, such that a seed inserted through the opening of the insertion cover is exactly moved toward the opening of the medium.

Advantageous Effects

According to the present disclosure, in the state that the container is covered by the guide cover and the insertion cover, seeds may be easily inserted into the medium disposed inside the container.

According to the present disclosure, in the state that the container is covered by the guide cover and the insertion cover, the arrangement spacing between seeds may be adjusted.

According to the present disclosure, the nutrients of the medium may be uniformly supplied to mutually different seeds by adjusting the arrangement spacing between the seeds.

According to the present disclosure, in the state that the guide cover covers the container, various insertion covers having mutually different openings may be seated in the guide cover, such that the arrangement spacing between the seeds may be adjusted.

According to the present disclosure, in the state that the container is covered by the guide cover and the insertion cover, the optical energy may be supplied only to the seeds seated in the medium to prevent weeds from being grown from the rest of the medium.

BEST MODE

[Mode for Invention]

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. When a certain element is "liked to", "coupled to", or "connected with" another element, the certain element may be directly linked to or connected with the another element, and a third element may be "linked", "coupled", or "connected" between the certain element and the another element.

Figure 1:
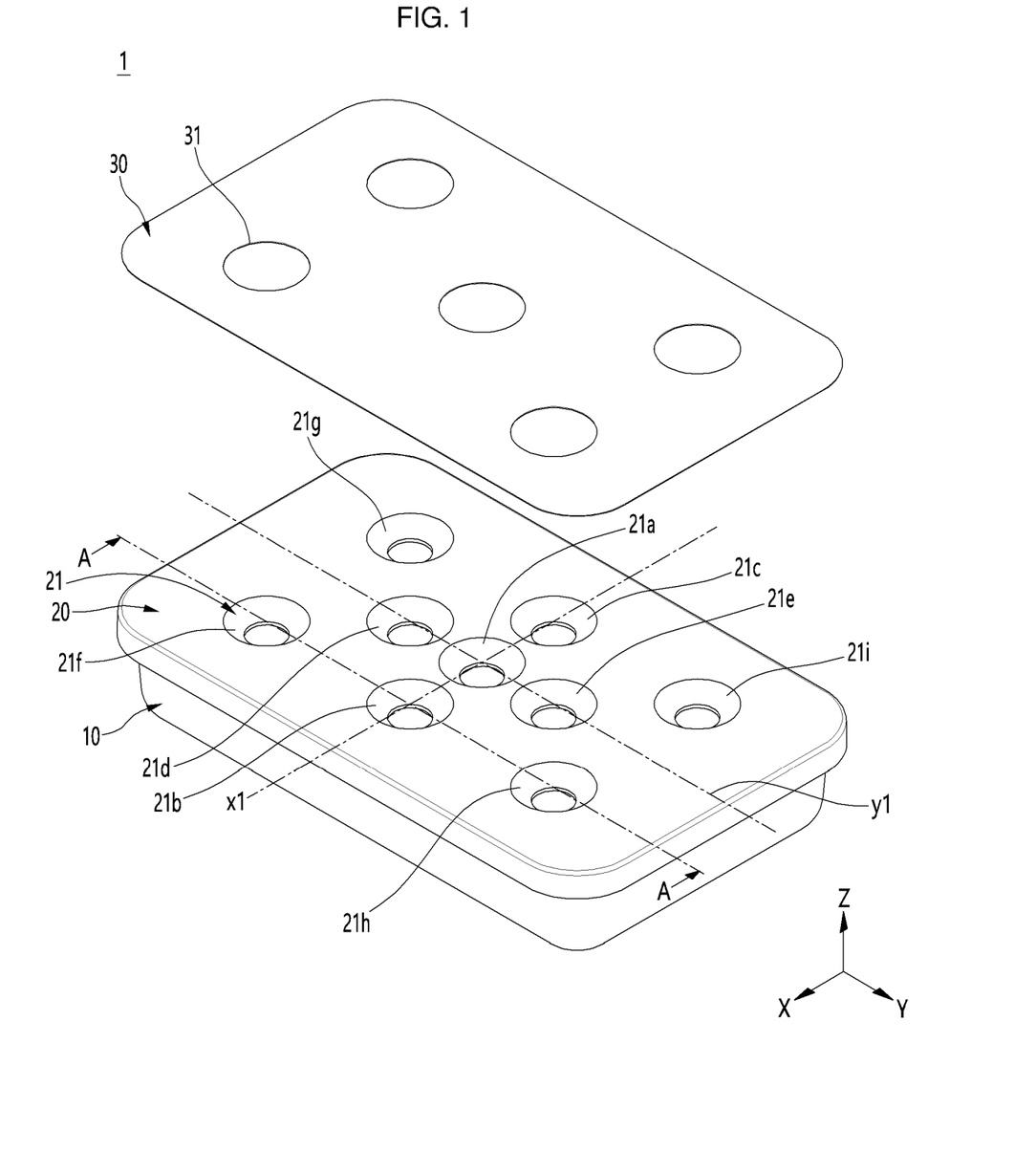
FIG. 1 is a perspective view of a plant container according to a first embodiment of the present disclosure.
Figure 2:
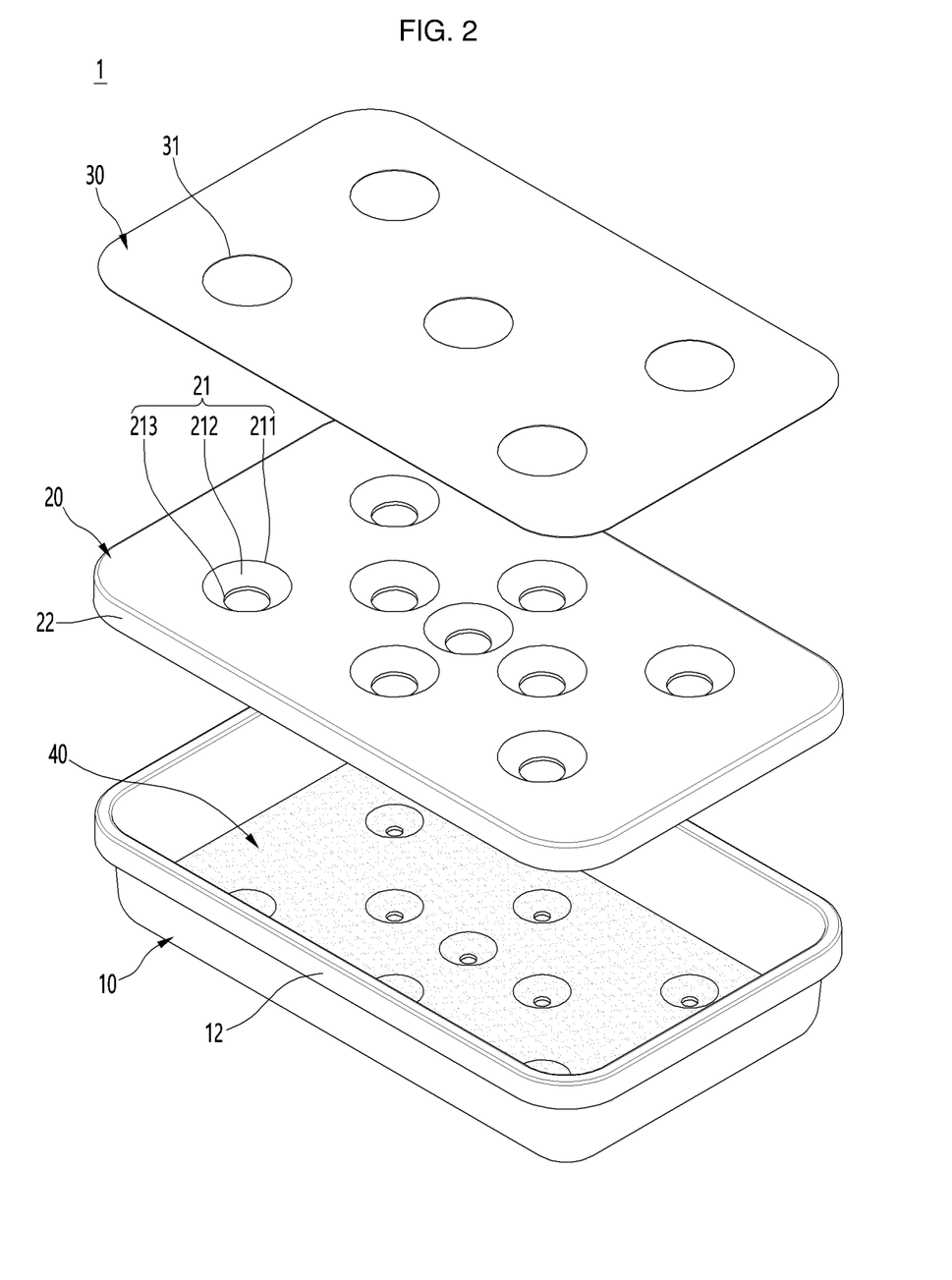
FIG. 2 is an exploded perspective view of a plant container according to a first embodiment of the present disclosure.
Figure 3:
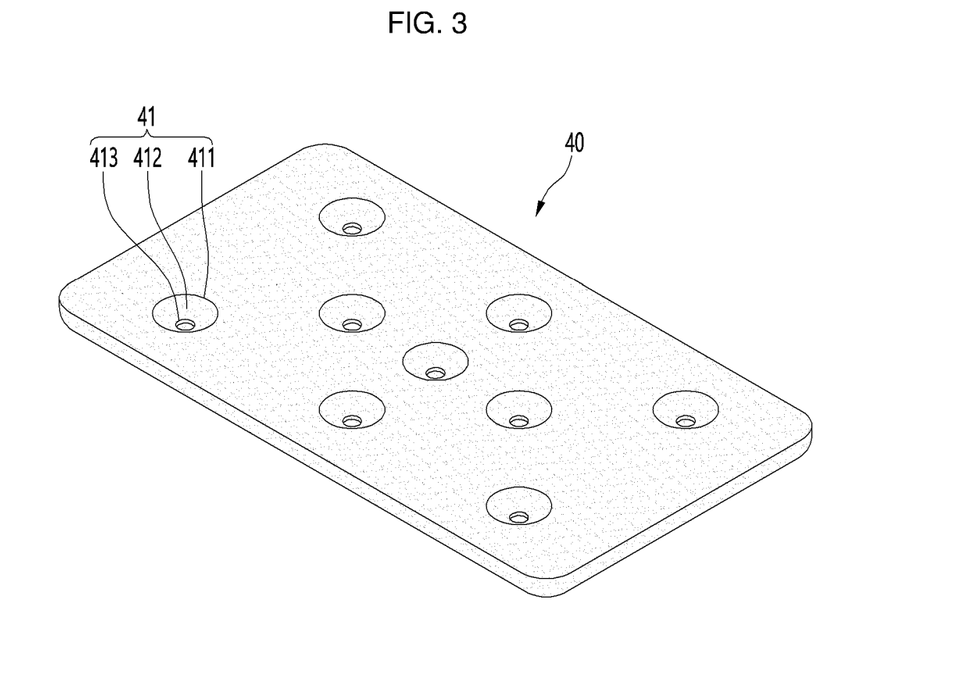
FIG. 3 is a perspective view of a medium according to a first embodiment of the present disclosure.

FIG. 1 is a perspective view of a plant container according to a first embodiment of the present disclosure, FIG. 2 is an exploded perspective view of a plant container according to a first embodiment of the present disclosure, and FIG. 3 is a perspective view of a medium according to a first embodiment of the present disclosure.

Referring to FIGS. 1 to 3, a plant or a seed may be cultivated in a plant container 1 according to the present disclosure. The plant or the seed may be sown and grown in the plant container 1. The plant container 1 may be disposed inside a plant growing apparatus to grow the plant or the seed. In addition, the plant container 1 may be exposed to an outdoor space to grow the plant or the seed.

The plant container 1 may include a container 10.

The container 10 may constitute a body of the plant container 1. A medium 40, which is to be described later, may be disposed on an inner bottom surface of the container 10. A cultivation space may be formed in the container 10 to sow a plant or a seed. The cultivation space is defined as a space positioned at an upper portion of the medium 40 to grow the plant or the seed. The container 10 may be formed in a polygonal shape having one surface which is opened. For example, the container 10 may be formed in a cube shape, a polygonal shape, or a circular shape having a top surface which is opened. According to the present embodiment, the container 10 is formed in the cube shape having a top surface which is opened. The medium 40 may be inserted into the container 10 through the top surface of the container 10.

Figure 5:
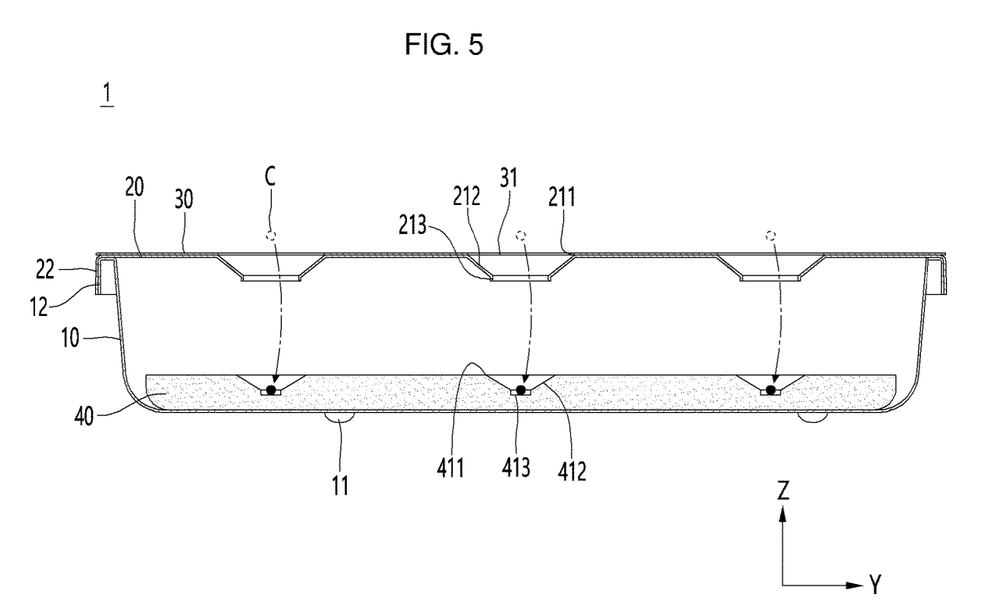
FIG. 5 is a cross-sectional view taken along line A-A of FIG. 1.

The container 10 may include a container support 11 (see FIG. 5). The container support 11 may be formed as a portion of the bottom surface of the container 10, which protrudes downward. A plurality of container supports 11 may be provided. For example, the plurality of container supports 11 may be disposed to be spaced apart from each other along a bottom edge of the container 10.

The container 10 may include a grip part 12 (see FIG. 5). The grip part 12 may be formed by bending an upper end portion of the container 10. The grip part 12 may be formed, as the upper end portion of the container 10 is bent in a side direction of the container 10 and then further bent in a downward direction of the container 10. In this case, the side direction of the container 10 may be defined in an x-axis direction or a y-axis direction, and the downward direction of the container 10 may be defined as a direction of facing downward based on a z-axis direction. A user may hold and move the container 10 using the grip part 12.

The plant container 1 may include a guide cover 20.

The guide cover 20 may be disposed at an upper portion of the container 10. The guide cover 20 may block the top surface of the container 10. The guide cover 20 may be formed as a flat surface. The guide cover 20 may be fixedly coupled to the container 10. When a plant or a seed is inserted into the container 10, the guide cover 20 may perform a function of guiding the movement of the seed. The guide cover 20 may be referred to as a first cover.

In detail, the guide cover 20 may further include a bent part 22. The bent part 22 may be formed, as an edge of the guide cover 20 is bent downward of the guide cover 20. The bent part 22 may be formed to cover the grip part 12. The bent part 22 may be formed to correspond to a portion of the grip part 12 bent downward. The guide cover 20 may be coupled to or separated from the container 10 in a vertical direction. When the guide cover 20 is coupled to the container 10, the bent part 22 may closely contact the grip part 12. When the bent part 22 closely contacts the grip part 12, the guide cover 20 may block the one surface of the container 10.

In other words, the guide cover 20 may be configured to be fitted into the upper portion of the container 10. As the guide cover 20 is configured to be fitted into the container 10, the guide cover 20 may be easily coupled to or separated from the container 10.

The guide cover 20 may include a guide opening 21. The guide opening 21 may be provided in the flat surface of the guide cover 20. The guide opening 21 may be formed, as a portion of the guide cover 20 is open. A plurality of guide openings 21 may be provided. The plurality of guide openings 21 may be arranged to be spaced apart from by specific spacing. The guide opening 21 may be defined as a passage to insert a plant or a seed into the container 10.

The plurality of guide openings 21 may be arranged on a reference line based on any one of a first reference line x1 and a second reference line y1. In addition, the plurality of guide openings 21 may be arranged at opposite sides of any one of the first reference line x1 and the second reference line y1. In addition, the plurality of guide openings 21 may be arranged symmetrically to each other about any one of the first reference line x1 and the second reference line y1. The first reference line x1 may be defined as a virtual line extending in the x-axis direction passing through the center of the guide cover 20. The second reference line y1 may be defined as a virtual line extending in the y axis direction passing through the center of the guide cover 20.

For example, nine guide openings 21 may be provided. The plurality of guide openings 21 may be formed to be equal to each other in size. Each of the nine guide openings 21 may be referred to as first to ninth openings. A first guide opening 21a may be disposed at the center of the guide cover 20. The second guide opening 21b and the third guide opening 21c may be arranged symmetrically to each other about the second reference line y1. The second guide opening 21b and the third guide 2c may be aligned on the first reference line x1. The fourth guide opening 21d and the fifth guide opening 21e may be arranged symmetrically to each other about the first reference line x1. The fourth guide opening 21d and the fifth guide opening 21e may be aligned on the second reference line y1. The sixth guide opening 21f and the seventh guide opening 21g, and the eighth guide opening 21h and the ninth guide opening 21i may be arranged symmetrically to each other about the first reference line x1. In addition, the sixth guide opening 21f and the eighth guide opening 21h, and the seventh guide opening 21g and the ninth guide opening 21i may be arranged symmetrically to each other about the second reference line y1.

The guide opening 21 may include a first opening 211, a cover inclined surface 212, and a second opening 213.

The first opening 211 may be formed in the flat surface of the guide cover 20. The first opening 211 may be understood as an opening formed in the guide cover 20. In addition, the first opening 211 may be understood as an inlet of a passage to move a plant or a seed into the container 10 from the outside.

The cover inclined surface 212 may be formed to extend downward from the guide cover 20. The cover inclined surface 212 may be inclined while extending downward from an outer circumferential surface of the first opening 211. The cover inclined surface 212 may connect the first opening 211 with the second opening 213. A seed inserted into the first opening 211 may move along the cover inclined surface 212, and the movement of the seed to the second opening 213 may be guided. In other words, an upper portion of the cover inclined surface 212 may be defined as the first opening 211, and a lower end portion of the cover inclined surface 212 may be defined as the second opening 213.

The second opening 213 may be understood as an outlet to move a seed, which is inserted into the first opening 211 and passes through the cover inclined surface 212, into the container 10. The second opening 213 may be formed to have a diameter smaller than a diameter of the first opening 211, thereby guiding the seed output after passing through the second opening 213, such that the seed is dropped to a specific position.

Meanwhile, the first opening 211, the cover inclined surface 212, and the second opening 213 of the guide opening 21 may be formed integrally with each other. The integrally-formed opening 21 may be referred as a guide hole.

The plant container 1 may include an insertion cover 30.

The insertion cover 30 may be disposed at an upper portion of the guide cover 20. The insertion cover 30 may be provided in the form of a flat surface to be seated on the guide cover 20. The insertion cover 30 may be fixed to the upper portion of the guide cove. The insertion cover 30 may be formed in size corresponding to the guide cover 20. The insertion cover 30, which is a cover to adjust the introduction of a seed into the guide opening 21 of the guide cover 20, may be referred to as a second cover.

The insertion cover 30 may include an inserting opening 31. The inserting opening 31 may be formed, as a portion of the insertion cover 30 is open. The inserting opening 31 may be formed to have a diameter equal to or greater than a diameter of the first opening 211. A plurality of inserting openings 31 may be provided. The plurality of inserting openings 31 may be positioned to correspond to the plurality of guide openings 21. The plurality of inserting openings 31 may be provided in number equal to or smaller than the number of the plurality of guide openings 21. The plurality of guide openings 21 and the inserting openings 31 may communicate with each other in a Z-axis direction. When the number of the inserting openings 31 is smaller than the number of the plurality of guide openings 21, some of the plurality of guide openings 21 may be blocked by the insertion cover 30. In addition, cultivating spacing between plants seated on the medium 40 may be varied depending on the number of the inserting openings 31.

For example, the plurality of inserting openings 31 may include first to ninth inserting openings corresponding to the first to ninth guide openings. Alternatively, the plurality of inserting openings 31 may include first to fifth inserting openings smaller in number than the first to ninth inserting openings. The first inserting opening may correspond to the first guide opening 21a, the second inserting opening may correspond to the sixth guide opening 21f, the third inserting opening may correspond to the seventh guide opening 21g, the fourth inserting opening may correspond to the eighth guide opening 21h, and the fifth inserting opening may correspond to the ninth guide opening 21i.

The plant container 1 may include the medium 40.

The medium 40 may be disposed on the inner bottom surface of the container 10. The medium 40 may include a nutrient required to grow a plant or a seed. Although the name of the medium 40 is employed according to the present embodiment, the medium 40 may be referred to as soil. The medium 40 may be mixed with water supplied into the container 10 to supply a nutrient to a plant or a seed sown on the medium 40. A cultivation space may be formed inside the container 10 and at an upper portion of the medium 40. The cultivation space may be understood as a space in which a plant receiving the nutrient from the medium 40 is grown. The cultivation space may be supplied with light passing through the guide opening 21 and the inserting opening 31. The plant grown in the cultivation space may receive optical energy from the light supplied through the guide opening 21 and the inserting opening 31, and may be grown toward the guide opening 21 and the inserting opening 31. A cultivation space having no guide opening 21 and inserting opening 31 may not be supplied with the optical energy.

The medium 40 may include a seating opening 41.

A plurality of the seating openings 41 may be provided in the medium 40. The seating opening 41 may be formed by cutting out a portion of the medium 40. Alternatively, the seating opening 41 may be formed by recessing a portion of the medium 40. The plurality of seating openings 41 may be disposed at positions corresponding to those of the plurality of guide openings 21. The seating opening 41, the guide opening 21, and the inserting opening 31 may be disposed in a vertical direction, based on the Z axis. In other words, the seed inserted into the inserting opening 31 may pass through the guide opening 21 and may be seated in the seating opening 41. The moving direction of the seed may be changed toward the seating opening 41 in the process of passing through the guide opening 21. According to the present embodiment, the plurality of seating openings 41 may be formed in number equal to the number of the plurality of guide openings 21. Meanwhile, the plurality of inserting openings 31 may be formed in number equal to or smaller than the number of the plurality of guide openings 21 and the plurality of seating openings 41. In other words, the number of inserting openings 31 is adjusted to adjust an amount of seeds to be seated in the seating openings 41 and seating positions of the seeds.

The seating opening 41 may include a first medium opening 411, a medium inclined surface 412, and a second medium opening 413.

The first medium opening 411 is formed, as a top surface of the medium 49 is opened. Alternatively, the first medium opening 411 may be formed by recessing the medium 40 downward. A seed output after passing through the guide opening 21 may be inserted into the first medium opening 411. According to the present embodiment, the first medium opening 411 may be formed to have a diameter equal to a diameter of the second opening 213 or smaller than the diameter of the second opening 213. The present disclosure is not limited thereto, but the first medium opening 411 may be formed to have a diameter greater than that of the guide opening 21.

The medium inclined surface 412 may be formed, as the top surface of the medium 40 is inclined downward. Alternatively, the medium inclined surface 412 may be formed, as the top surface of the medium 40 is recessed to be inclined downward. An upper end portion of the medium inclined surface 412 may be defined as the first medium opening 411. A lower end portion of the medium inclined surface 412 may be defined as the second medium opening 413. The medium inclined surface 412 may guide the moving direction of a seed inserted into the first medium opening 411 such that the seed moves toward the second medium opening 413.

The second medium opening 413 may be formed to be more recessed downward of the medium 40 from the lower end portion of the medium inclined surface 412. The second medium opening 413 may be formed to have a diameter less than the diameter of the first medium opening 411. The second medium opening 413 may be defined as an opening in which a seed moved along the medium inclined surface 412 is seated. The seed may be grown in the state that the seed in the second medium opening 413.

Meanwhile, the first medium opening 411, the medium inclined surface 412, and the second medium opening 413 may be formed integrally with each other. The integrally-formed seating opening 41 may be referred to a seating recess part.

Figure 4A:
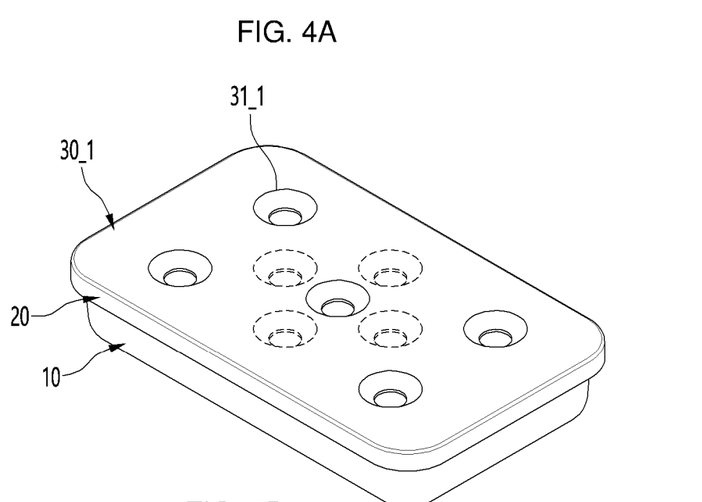
FIGS. 4A and 4B are perspective views of an insertion cover according to a first embodiment of the present disclosure.
Figure 4B:
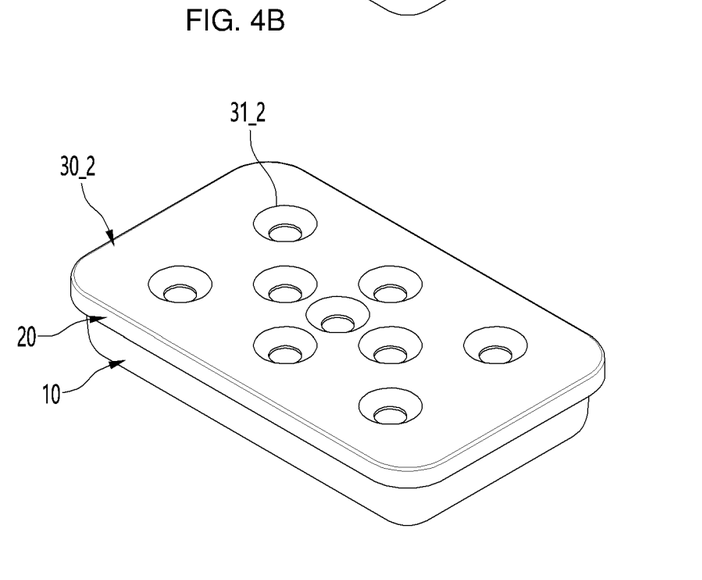

FIG. 4 is a perspective view of an insertion cover according to a first embodiment of the present disclosure.

Referring to FIG. 4, according to the present disclosure, the plant container 1 may include the insertion cover 30 in which the number of the inserting openings 31 is adjusted. For example, a plurality of inserting opening 31-1 provided in a second cover 30-1 may be provided in number equal to the number of the plurality of guide openings 21. For another example, a plurality of inserting openings 31-2 provided in the second cover 30-2 may be provided in number smaller than the number of the plurality of guide openings 21. Reference sign (A) of FIG. 4 is a view in which the plurality of inserting openings 31-1 is smaller than the number of the plurality of guide openings 21. Reference sign (B) of FIG. 4 is a view in which the number of the plurality of inserting openings 31-2 is equal to the number of the plurality of guide openings 21.

In other words, the number of the inserting openings 31 provided in the insertion cover 30 is adjusted to adjust an amount of seeds to be seated in the seating openings 41 and seating positions of the seeds. For example, the seating position of a seed inserted into the first inserting opening of the plurality of inserting openings 31 is away from the seating position of a seed inserted into the second inserting opening of the plurality of inserting openings 31, and the two seeds do not interfere with each other in a growing process. In addition, since the two seeds are spaced apart from each other, nutrients may be uniformly supplied to the two seeds.

In addition, the number of the inserting openings 31 provided in the insertion cover 30 may be adjusted to adjust an amount of optical energy supplied to a plant grown in the seating opening of the medium 40. For example, weeds may be prevented from being unnecessarily grown from the medium 40, as the optical energy is supplied to an area other than the seating opening 41, FIG. 5 is a cross-sectional view taken along line A-A of FIG. 1.

Referring to FIG. 5, the process of inserting a seed "c" into the plant container 1 will be described in detail according to the present disclosure.

The medium 40 may be inserted through the one surface, which is opened, of the container 10. After placing the medium 40 on the inner bottom surface of the container 10, water is supplied to the medium 40 to make an environment in which a plant or a seed is grown.

The guide cover 20 may be coupled to the container 10. The guide cover 20 may be coupled to an upper portion of the container 10, and the insertion cover 30 may be seated at the upper portion of the guide cover 20. When the guide cover 20 and the insertion cover 30 are fixed to the container 10, the seating opening 41 of the medium 40, the guide opening 21 of the guide cover 20, and the inserting opening 31 of the insertion cover 30 may be aligned with each other in the vertical direction based on the z axis. The guide openings 21 and the seating openings 41 may be provided in equal number. The number of the inserting openings 31 may be provided to be equal to the number of the guide openings 21 or to be smaller than the number of the guide openings 21. An amount of seed "c" to be inserted into the seating opening 41 and the seating position of the seed "c" may be adjusted by the number of the inserting openings 31.

The seed "c" inserted into the inserting openings 31 may be dropped into the seating opening 41 after moving in sequence of the first opening 211, the cover inclined surface 212, and the second opening 213 of the guide opening 21. The moving direction of the seed "c" to the seating opening 41 may be guided to the seating opening 41 by the second opening 213 having a diameter smaller than diameters of the cover inclined surface 212 and the first opening 211.

The seed "c" inserted into the seating opening 41 may be seated in the second medium opening 413, after moving in the sequence of the first medium opening 411 and the medium inclined surface 412 of the seating opening 41. The seed "c" may exactly arrive at the second medium opening 413 by the medium inclined surface 412.

The seed "c" seated in the second medium opening 413 may be grown by receiving nutrients from the medium 40. The seed "c" may be grown by receiving optical energy which is supplied through the inserting opening 31 and the guide opening 21 through which the seed "c", which is to be inserted, passes. The seed "c" may be grown toward the inserting opening 31 and the guide opening 21 in the growing process, and may be exposed to the outdoor space through the inserting opening 31 and the guide opening 21.

A plant container according to a second embodiment of the present disclosure has a feature modified in some components of the plant container according to a first embodiment. Accordingly, remaining components of the plant container according to the second embodiment may be the same as remaining components of the plant container according to the first embodiment. Accordingly, the details of remaining components of the plant container according to the second embodiment may be substituted with the description of the remaining components of the plant container according to the first embodiment.

Figure 6:
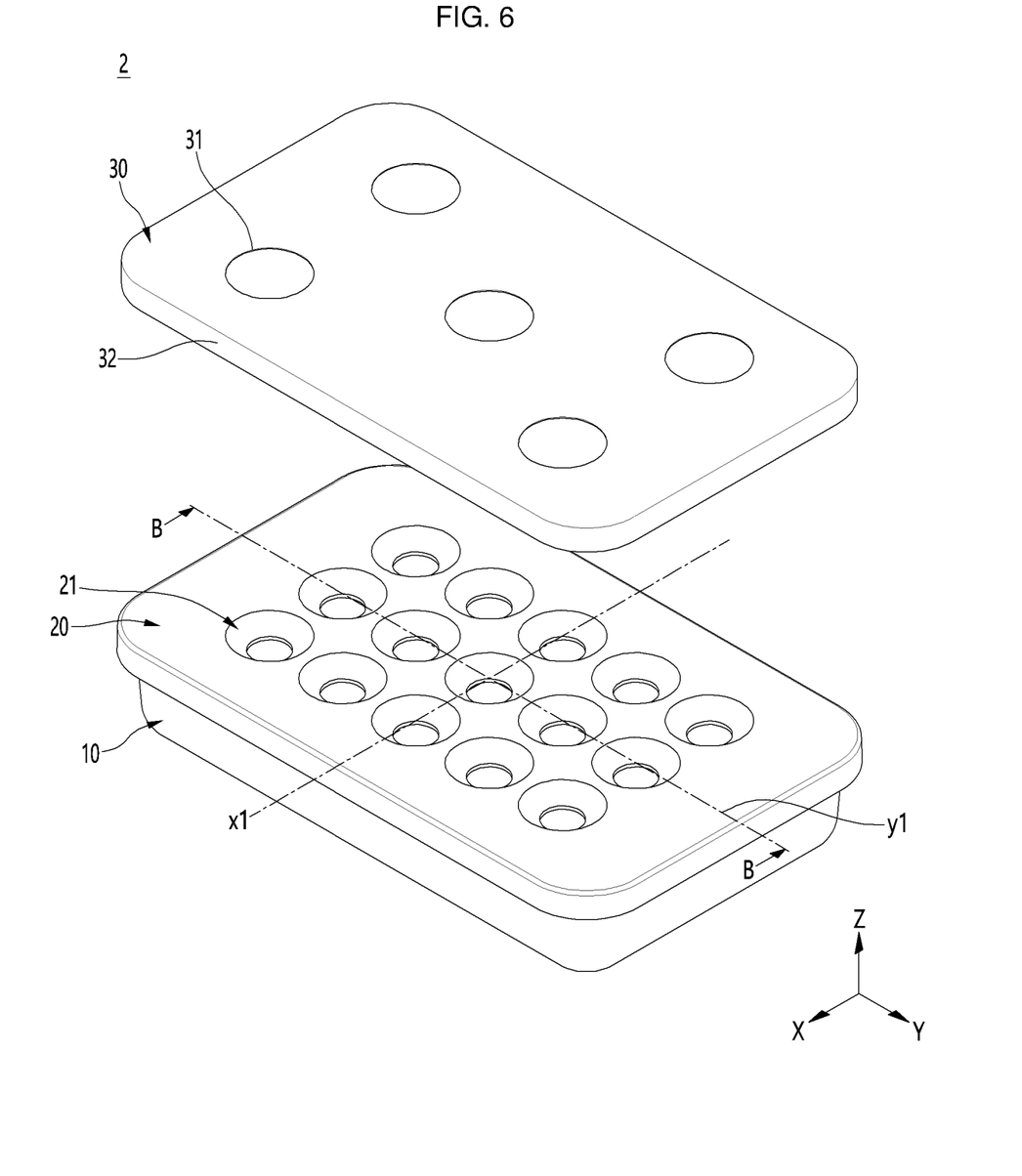
FIG. 6 is a perspective view of a plant container according to a second embodiment of the present disclosure.
Figure 7:
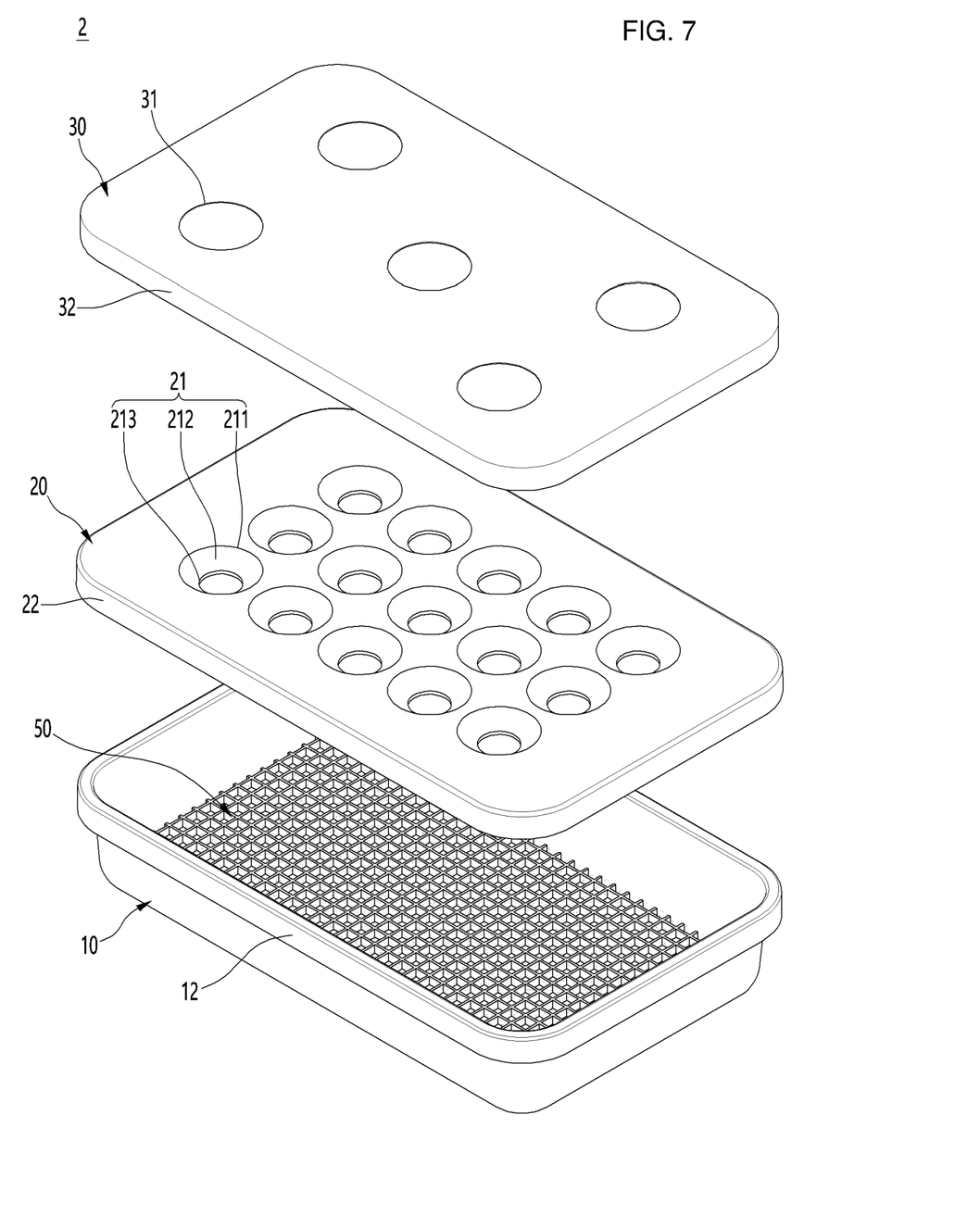
FIG. 7 is an exploded perspective view of a plant container according to a second embodiment of the present disclosure.
Figure 8:
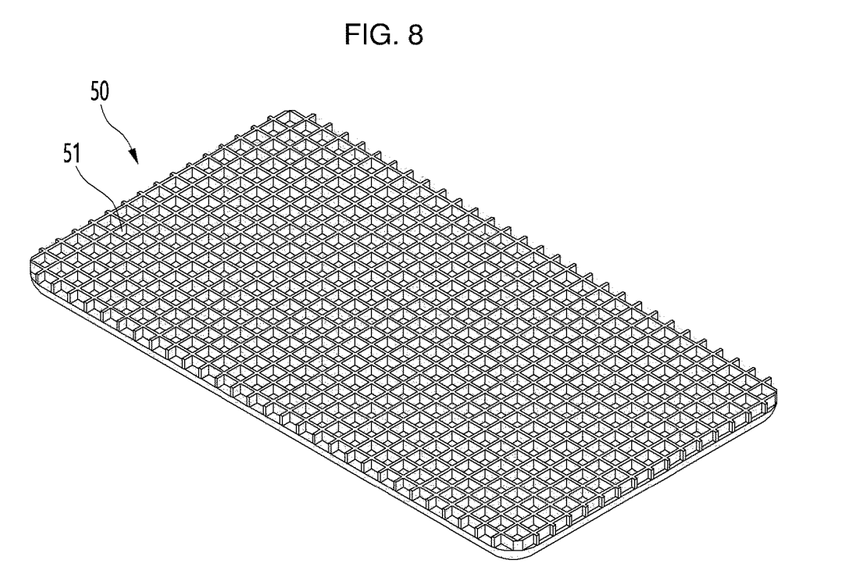
FIG. 8 is a perspective view of a medium according to a second embodiment of the present disclosure.
Figure 9:
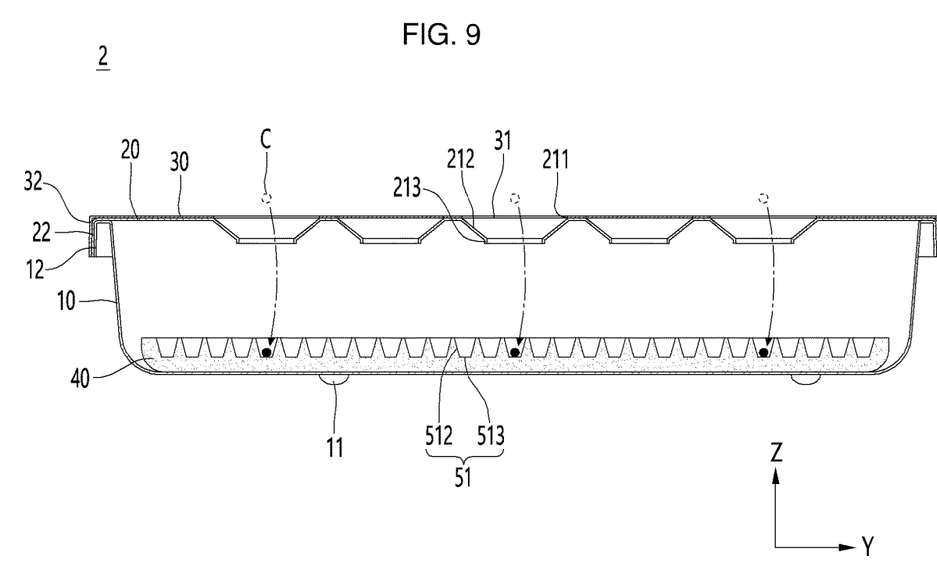
FIG. 9 is a sectional view taken along line B-B of FIG. 6.

FIG. 6 is a perspective view of a plant container according to the second embodiment of the present disclosure, FIG. 7 is an exploded perspective view of a plant container according to the second embodiment of the present disclosure, FIG. 8 is a perspective view of a medium according to the second embodiment of the present disclosure, and FIG. 9 is a sectional view taken along line B-B.

Referring to FIGS. 6 to 9, a plant container 2 according to the present disclosure may include a container 10, a guide cover 20, an insertion cover 30, and a medium 50. The medium 50 may be disposed inside the container 10 through one surface, which is opened, of the container 10. The guide cover 20 may be coupled to the one surface, which is opened, of the container 10. The insertion cover 30 may be coupled to an upper portion of the guide cover 20.

The insertion cover 30 may further include an extension part 32.

The extension part 32 may be provided in the insertion cover 30 such that the insertion cover 30 is coupled to the guide opening 21. The extension part 32 may be formed, as an edge of the insertion cover 30 extends downward of the insertion cover 30. The extension part 32 may be coupled to a protruding part 22 of the guide cover 20, in close contact with the protruding part 22. In other words, the insertion cover 30 may be fitted into the guide cover 20 by the extension part 32. The extension part 32 may extend downward from the insertion cover 30 to correspond to the protruding part 22. The insertion cover 30 may be fixed to the guide cover 20, in close contact with the guide cover 20 by the extension part 32.

According to the present embodiment, a plurality of guide openings 21 may be formed in the guide cover 20. The plurality of guide openings 21 may be disposed to be spaced apart from each other. For example, 15 guide openings 21 may be provided. The 15 guide openings 21 may be defined as first to fifteenth openings. The plurality of guide openings 21 may be arranged in the x-axis direction and the y-axis direction. Three guide openings of the 15 guide openings may be aligned in the x-axis direction, and five guide openings of the 15 guide openings 21 may be aligned in the y-axis direction.

The insertion cover 30 may include inserting openings 31 provided in number equal to the number of the guide openings 21 or smaller than the number of the guide openings 21. When the insertion cover 30 is coupled to the guide cover 20, the number of guide openings 21, which is able to be exposed to the outdoor space, may be changed due to the number of the inserting openings 13.

According to the present embodiment, the medium 50 may include a plurality of seating openings 51. The plurality of seating openings 51 may be defined as a plurality of porous parts formed in the medium 50. The plurality of seating openings 51 may be arranged in the x-axis direction and the y-axis direction on the top surface of the medium 50. The plurality of seating openings 51 may be formed, as the top surface of the medium 50 is recessed downward of the medium 50. For example, the seating opening 51 may be formed in a polygonal shape or a circular shape.

The seating opening 51 may include an inclined surface 512 and a seating surface 513. The inclined surface 512 may constitute a side surface of the seating opening 51. The seating surface 513 may constitute a bottom surface of the seating opening 51. The top surface of the seating opening 51 may be opened, and the seed "c" may be inserted into the opened top surface. The seed "c" inserted through the opened top surface of the seating opening 51 may move downward along the inclined surface 512 and may be seated on the seating surface 513.

The inserting opening 31 and the guide opening 21 may be arranged in the vertical direction, based on the z-axis direction and may communicate with each other. In addition, the guide opening 21 and at least one seating opening 51 may be disposed in a vertical direction, based on the z-axis direction. The at least one seating opening 51 may be disposed at the projected area of the guide opening 21. In detail, at least one seating opening 51 may be disposed in the projected area of the second opening 213 of the guide opening 21. The seed "c" passing through the guide opening 21 may be inserted into one of at least one seating opening 51 disposed at the projected area of the second opening 213.

According to the present disclosure, as the insertion cover 30 and the guide cover 20 are coupled to each other in close contact with each other, the insertion cover 30 and the guide cover 20, which are integrated with each other, may be separated from the container 10. In addition, the seed "c" inserted through the inserting opening 31 and the guide opening 21 may be exactly inserted into the one seating opening 51 of the plurality of seating openings 51. In other words, as the seed "c" is placed on the top surface of the medium 50, the supply shortage of moisture and nutrients to the seed "c" may be prevented.

Figure 10A:
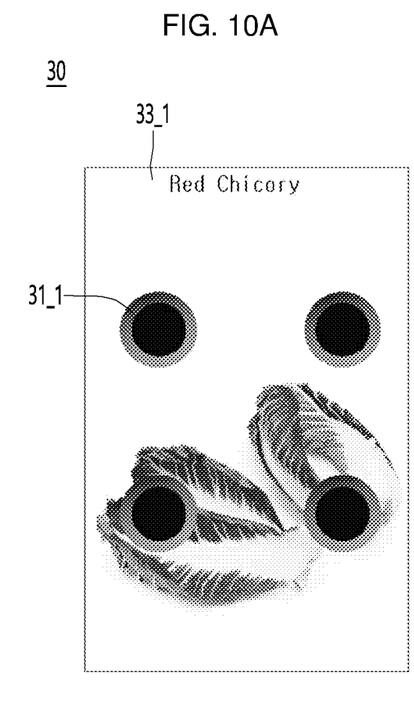
FIGS. 10A to 10C are plan views of an insertion cover according to a second embodiment of the present disclosure.
Figure 10B:
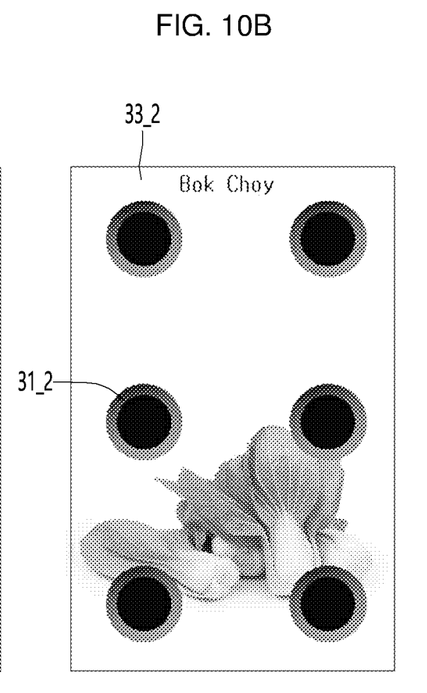
Figure 10C:
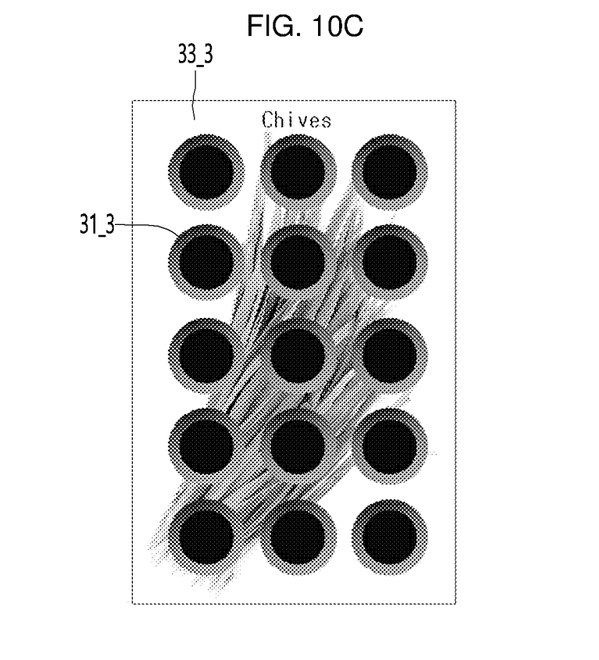

FIG. 10 is a plan view of an insertion cover according to a second embodiment of the present disclosure.

Referring to FIG. 10, according to the present embodiment, the plant cover 2 may include an insertion cover 30 in which the number of inserting openings 31 is adjusted. The insertion cover 30 may include a plurality of insertion covers 30 such as a first insertion cover 30, a second insertion cover 30, and a third insertion cover 30. Four first inserting openings 31-1 may be provided in the first insertion cover 30, six second inserting openings 31-2 may be provided in the second insertion cover 30, and 15 third inserting openings 31-3 may be provided in the third insertion cover 30. The first insertion cover 30 is illustrated in reference numeral (a) of FIG. 10, the second insertion cover 30 is illustrated in reference numeral (b) of FIG. 10, and the third insertion cover 30 is illustrated in reference numeral (c) of FIG. 10. The number of the inserting openings 31 may be adjusted. According to the present disclosure, the inserting openings 31 provided in the first insertion cover 30, the second insertion cover 30, and the third insertion cover 30 may be adjusted by constructing the growth of the plant. In addition, when the number of the inserting openings 31 is adjusted, the spacing between the inserting openings 31 may be adjusted depending on the number of the inserting openings 31.

Plant information 33 may be displayed on the insertion cover 30. The plant information 33 may be provided on the top surface of the insertion cover 30. The plant information 33 may include information on an image of a plant, the name of the plant, and a growing manner of the plant. The plant information 33 may be provided, as the top surface of the insertion cover 30 is printed with the plant information 33. First plant information 33-1 may be displayed on the first insertion cover 30, second plant information 33-2 may be displayed on the second insertion cover 30, and third plant information 33-3 may be displayed on the third insertion cover 30. The first insertion cover 30, the second insertion cover 30, and the third insertion cover 30 may differ from each other in the plant information 33 and the number of the inserting opening 31. The number of the inserting opening 31 and the position of the inserting opening 31 may be adjusted by considering the growth of the plant displayed on the insertion cover 30.

The insertion cover 30 is separately coupled to the guide cover 20. The type of a plant, which is to be grown in the plant container 2, may be easily changed by changing the insertion cover 30.

The invention claimed is:
1. A plant container, comprising:
  a container provided therein with a cultivation space and having an open top surface;

a guide cover coupled to the container to cover the open top surface of the container and including a plurality of guide openings spaced apart from each other;

a medium disposed on an inner bottom surface of the container and including a plurality of seating openings disposed at positions corresponding to the plurality of guide openings; and an insertion cover coupled to the guide cover to cover an upper portion of the guide cover and including at least one inserting opening disposed at a position corresponding to at least one guide opening of the plurality of guide openings, wherein the plurality of guide openings each includes:

a first opening formed in the guide cover;

a cover inclined surface that is inclined downward from the first opening; and a second opening disposed at a lower end of the cover inclined surface and having a diameter less than a diameter of the first opening, wherein the plurality of seating openings each includes:

a first medium opening formed in a top surface of the medium;

a medium inclined surface that is recessed from the first medium opening to be inclined downward; and a second medium opening that is further recessed downward from a lower end of the medium inclined surface and having a diameter less than a diameter of the first medium opening, wherein the seating opening, the guide opening, and the inserting opening are disposed in a vertical direction, wherein the second opening of the guide opening has a diameter less than a diameter of the first medium opening and greater than a diameter of the second medium opening, and wherein a seed inserted into the at least one inserting opening passes through the guide opening and is seated in the second medium opening of the seating opening.

2. The plant container of claim 1, wherein the number of the at least one inserting opening corresponds to a number of the plurality of guide openings, or wherein the number of the at least one inserting opening is smaller than a number of the plurality of guide openings.

3. The plant container of claim 2, wherein a portion of the plurality of guide openings is blocked by the insertion cover when the number of the at least one inserting opening is smaller than the number of the plurality of guide openings.

4. The plant container of claim 2, wherein when the number of the at least one inserting opening corresponds to the number of the plurality of guide openings, the plurality of seating openings and the plurality of guide openings are open.

5. The plant container of claim 1, wherein the container further comprising:

at least one container support that protrudes downward from a bottom surface of the container.

6. The plant container of claim 1, wherein a portion of the plurality of guide openings is disposed on any one reference line of a first reference line or a second reference line passing through a center of the guide cover.

7. The plant container of claim 6, wherein a remaining portion of the plurality of guide openings is arranged symmetrically to each other about any one of the first reference line or the second reference line.

8. The plant container of claim 1, wherein each of the at least one inserting opening, the plurality of guide openings, and the plurality of seating openings are formed in a circular shape.

9. The plant container of claim 8, wherein each of the at least one inserting opening and the plurality of guide openings are formed in a circular shape having a diameter greater than a diameter of the plurality of seating openings.

10. The plant container of claim 1, wherein the plurality of guide openings is formed as a passage having a diameter reduced from an inlet of the plurality of guide openings to an outlet of the plurality of guide openings.

11. The plant container of claim 1, wherein the number of the at least one inserting opening is smaller than a number of the plurality of guide openings and the plurality of seating openings.

12. The plant container of claim 1, further comprising:

a grip bent in a lateral direction and then bent in a downward direction at an upper end portion of the container.

13. The plant container of claim 1, wherein the guide cover further includes a bent portion that is bent downward from an edge portion of the guide cover to cover the grip, and wherein when the container is coupled to the guide cover, the bent portion and the grip contact each other.

14. The plant container of claim 13, wherein the insertion cover further includes an extension portion that extends downward from an edge portion of the insertion cover to cover the bent portion, and wherein when the guide cover is coupled to the insertion cover, the bent portion contacts the extension portion.

15. The plant container of claim 1, wherein a top surface of the insertion cover is configured to display plant information.

16. The plant container of claim 1, wherein a number of the at least one inserting opening and the position of the at least one inserting opening are adjusted based on a growth of the plant displayed on the insertion cover.

* * * * *